Dec. 11, 1934.     H. F. JOHNSON     1,984,021
MACHINE FOR FORMING FORGINGS
Filed May 2, 1932      5 Sheets-Sheet 1
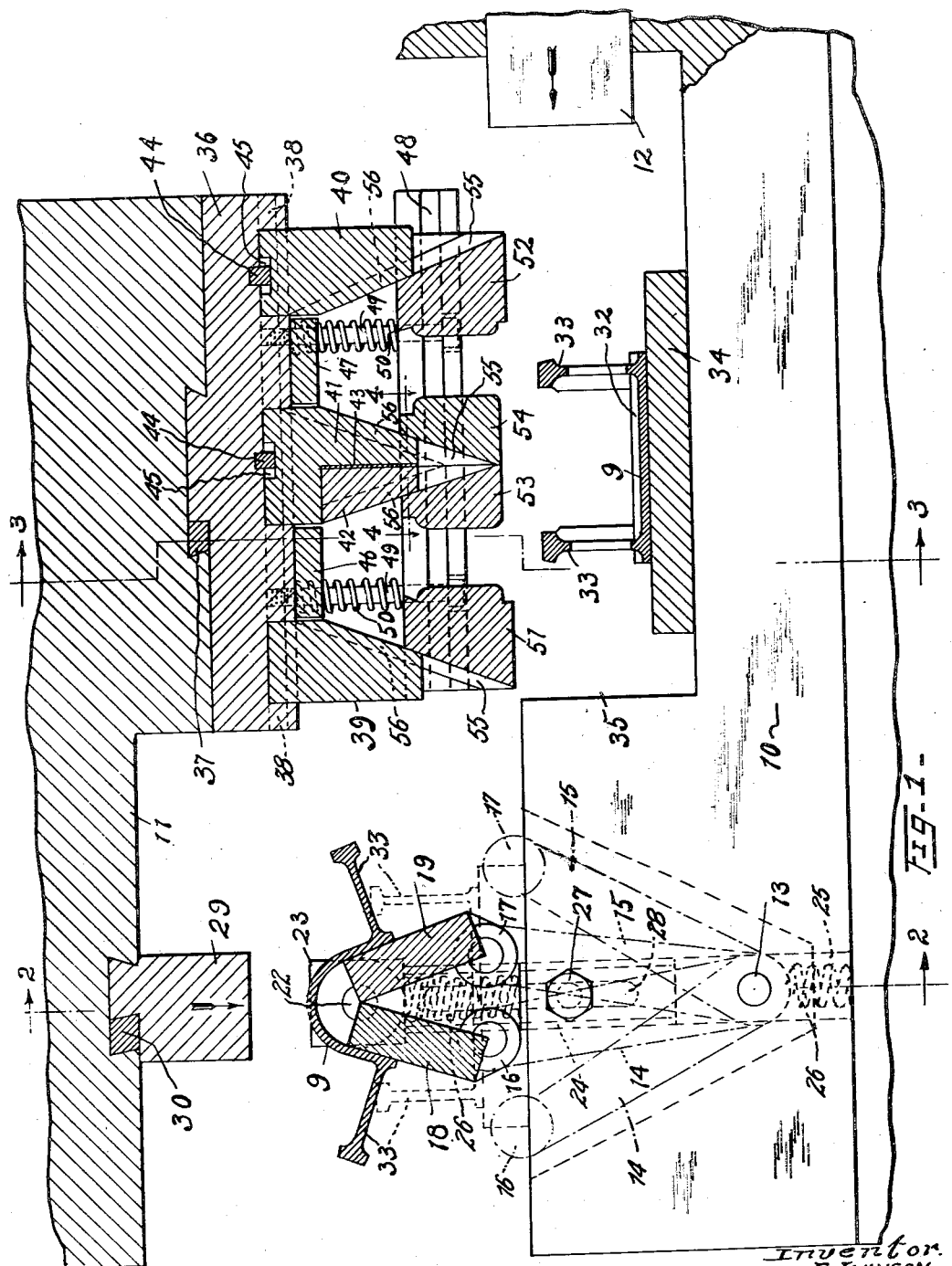
Inventor.
HOWARD F. JOHNSON
Kwis Hudson & Kent
attys.

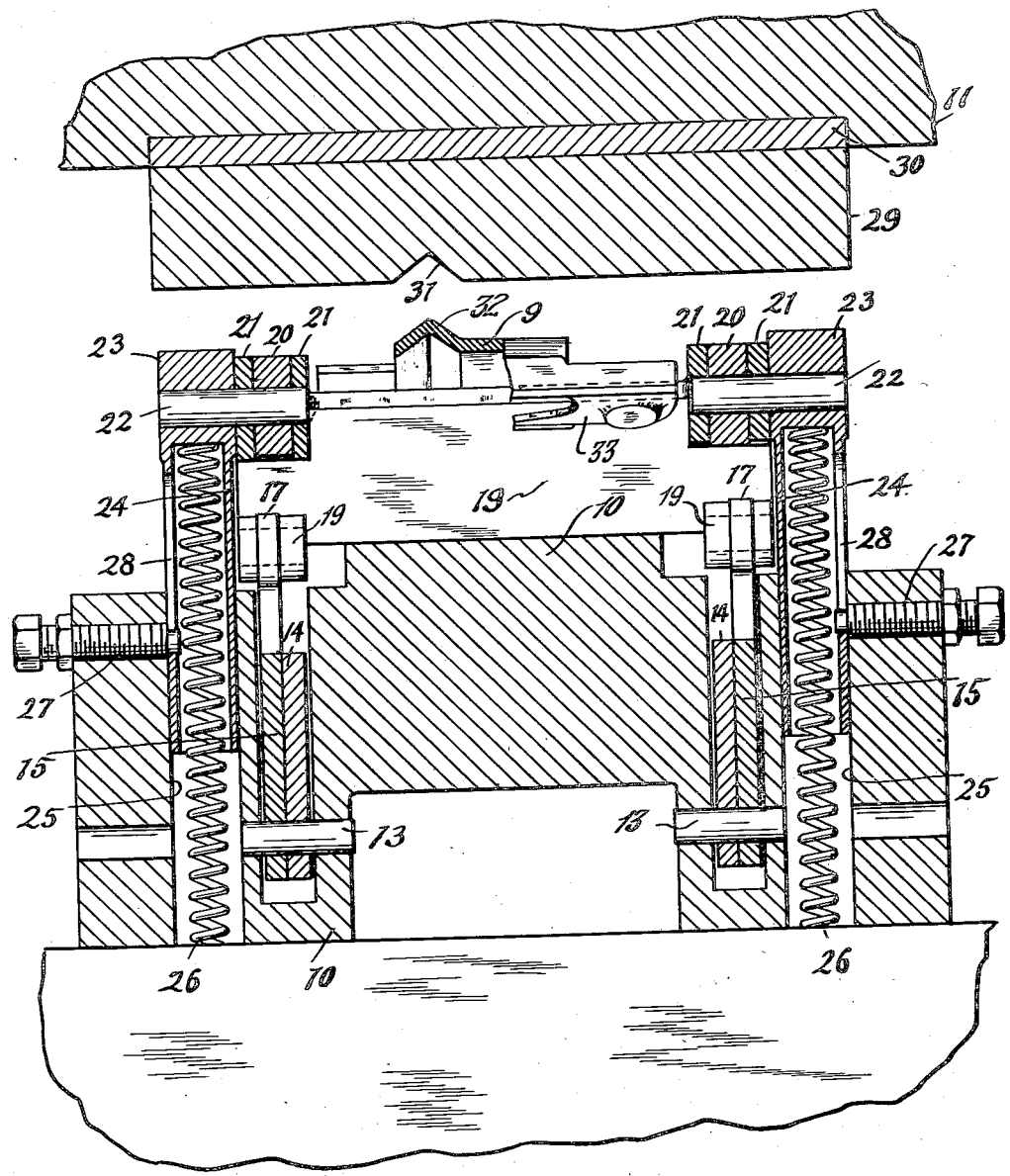
Fig-2-

Dec. 11, 1934.  H. F. JOHNSON  1,984,021
MACHINE FOR FORMING FORGINGS
Filed May 2, 1932    5 Sheets-Sheet 3
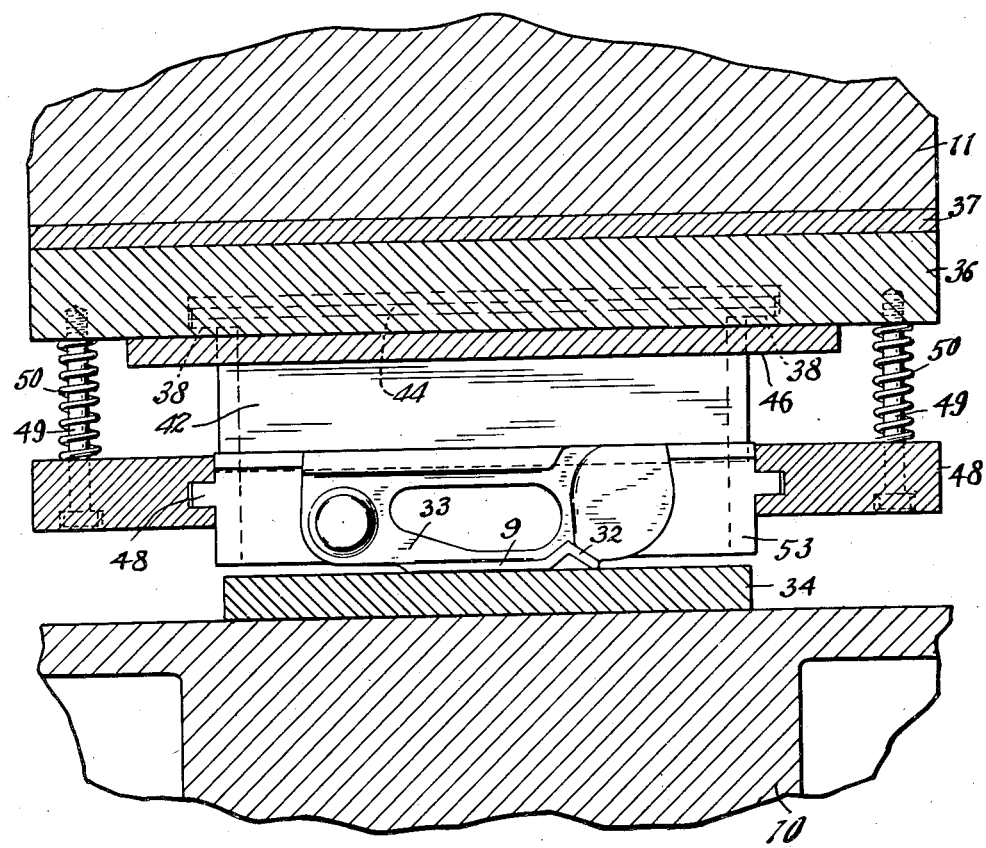
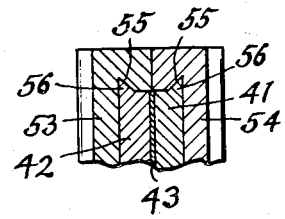
Inventor
HOWARD F. JOHNSON
Kwis Hudson & Kent
attys.

Dec. 11, 1934.  H. F. JOHNSON  1,984,021
MACHINE FOR FORMING FORGINGS
Filed May 2, 1932  5 Sheets-Sheet 4
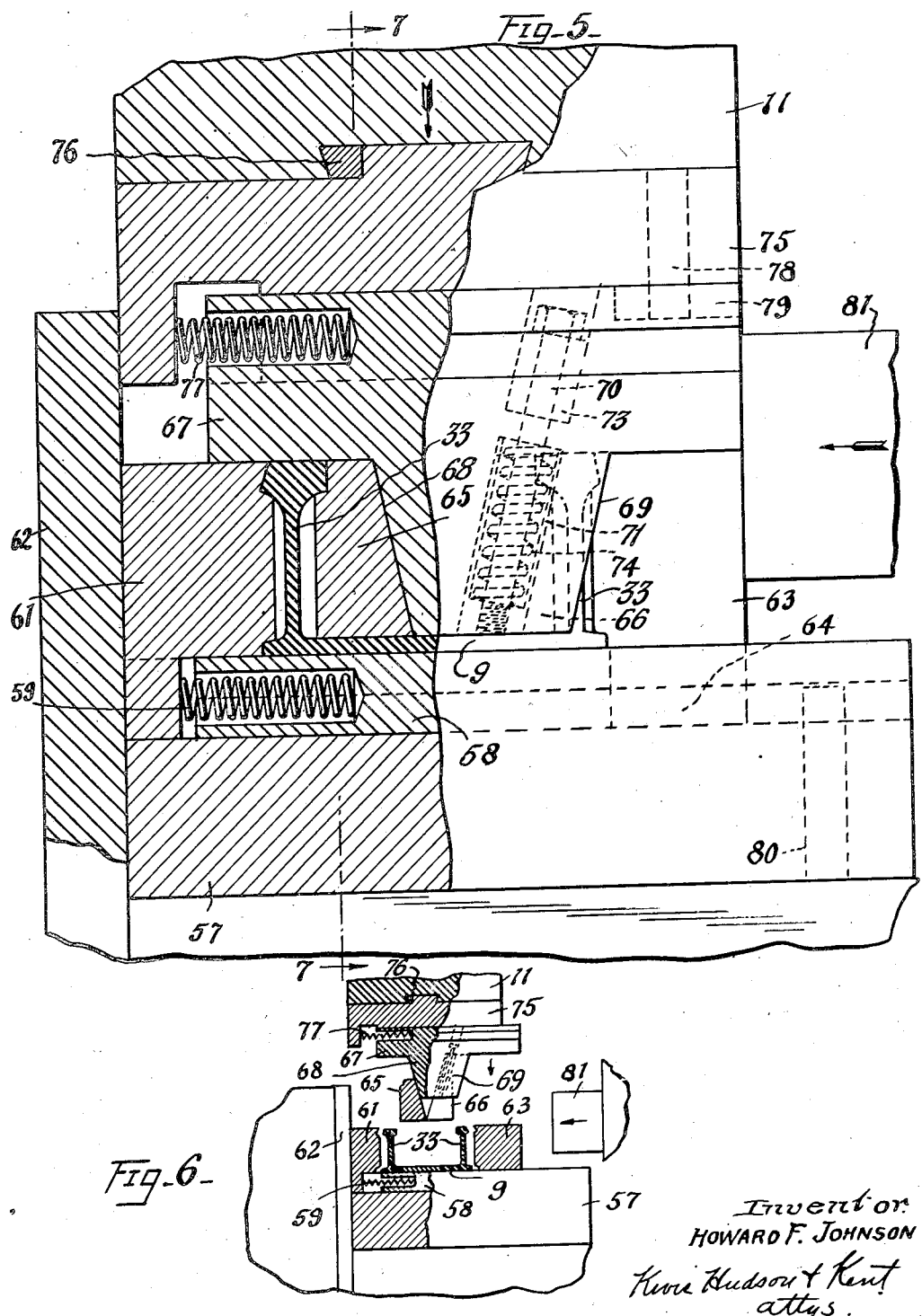
Inventor:
HOWARD F. JOHNSON.
Kerr Hudson & Kent
attys.

Inventor.
HOWARD F. JOHNSON
Kwis Hudson & Kent
attys.

Patented Dec. 11, 1934

1,984,021

UNITED STATES PATENT OFFICE 1,984,021

MACHINE FOR FORMING FORGINGS

Howard F. Johnson, Cleveland, Ohio, assignor to The Champion Machine and Forging Company, Cleveland, Ohio, a corporation of Ohio Application May 2, 1932, Serial No. 608,665

17 Claims. (Cl. 153—34)

This invention relates to improvements in machines for forming forgings, and has reference particularly to machines wherein an article forged in a deformed shape is first bent into the desired shape and then subjected to a further operation for truing up and sizing.

One of the objects of the invention is the simplification of manufacturing methods and a reduction in the amount of handling necessary.

A further object is the provision of a machine in which the truing and sizing operation follows almost immediately after the bending operation, so that a minimum of cooling takes place between the two operations, and the second one is economically performed to produce articles of high quality.

Another object is the provision of a novel bending mechanism of simple form requiring a minimum amount of servicing and replacement.

Another object is the provision of novel means for truing and sizing the treated articles after they are bent up into the desired form.

Other objects and features of novelty will appear as I proceed with the description of those embodiments of the invention which, for the purposes of the present application, I have illustrated in the accompanying drawings, in which Figure 1 is an elevational view, in vertical section, of a fragment of a machine embodying the invention.

Fig. 2 is a vertical sectional view taken substantially on the line 2—2 of Fig. 1.

Fig. 3 is a vertical sectional view taken substantially on the line 3—3 of Fig. 1, but showing the bolster or gripper head of the machine part way down in its descending stroke.

Fig. 4 is a horizontal cross sectional view taken substantially on the line 4—4 of Fig. 1.

Fig. 5 is an elevational view, partly in vertical section, showing a different form of the truing and sizing portion of the machine, this view illustrating the parts at the completion of their operative strokes.

Fig. 6 is a similar view, on a smaller scale, showing the moving parts in their retracted positions and the finished forging ready to be removed.

Figure 7:
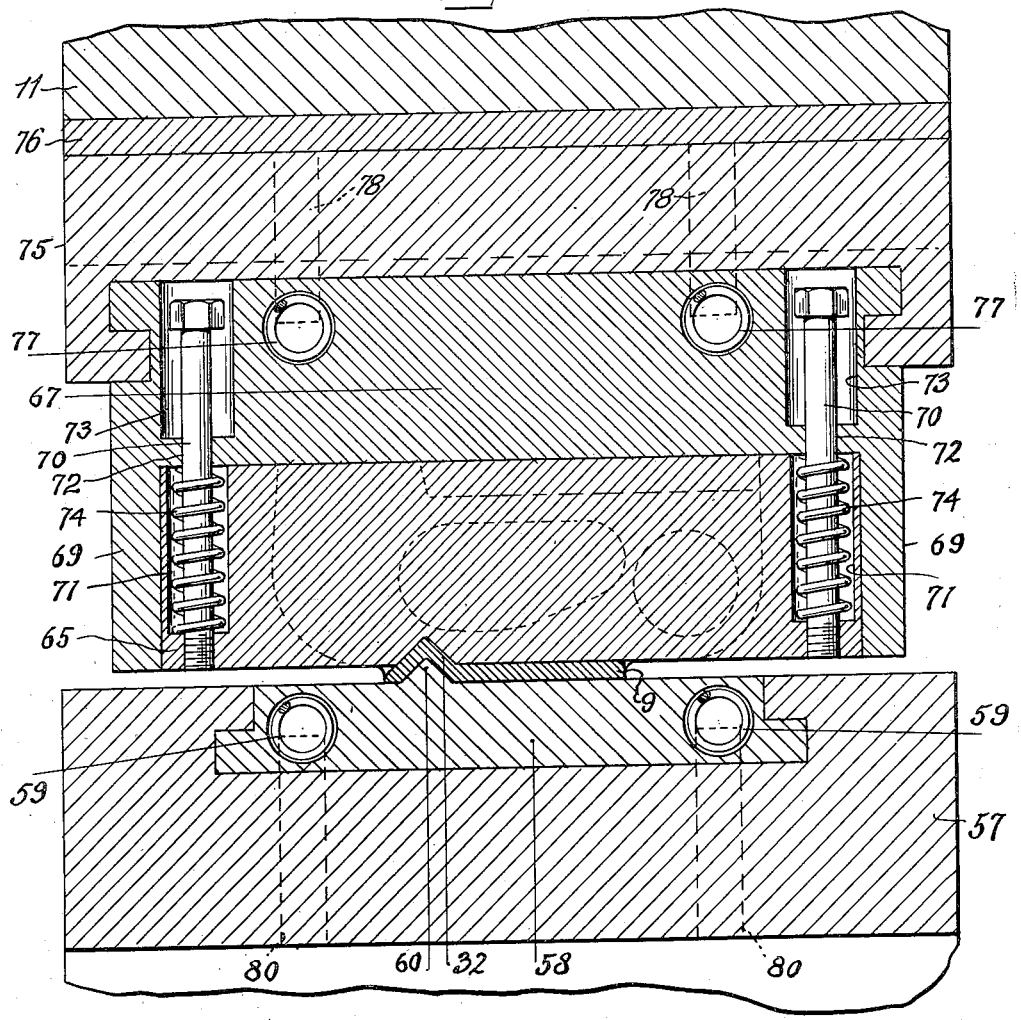
Fig. 7 is a vertical sectional view taken substantially on the line 7—7 of Fig. 5.
Figure 8:
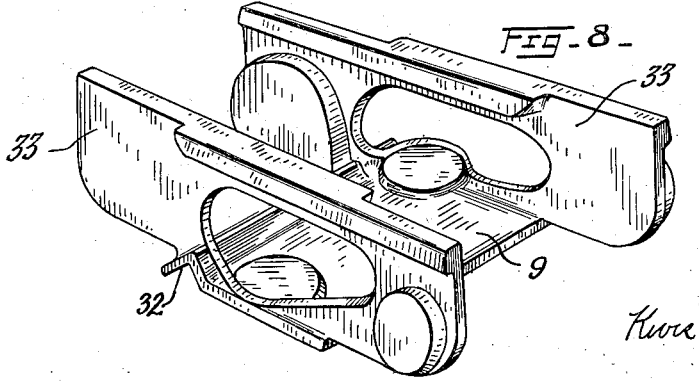
Fig. 8 is a perspective view of a forging which may be treated upon the machine in accordance with the present invention.

Referring now to Fig. 1 of the drawings, the base or bed of the machine is indicated at 10, and the vertically movable bolster or gripper head at 11. The machine also comprises a horizontally moving ram 12. Machines of this general character are well known in the art, and hence the structure and driving mechanism are not herein illustrated in detail. It may be stated however that such machines have a cycle of movements in which the bolster 11 first descends, the ram 12 next moves inwardly to perform its function and then recedes, and the bolster 11 then rises to its inoperative position.

In the bed 10 of the machine there are two aligned pivot pins 13, upon both of which are mounted pairs of links 14 and 15. These links terminate at their upper extremities in eyes 16 and 17. Above the links 14 and 15 there is a second pair of links 18 and 19 which are shorter than the first mentioned links. These links 18 and 19 are in the form of heavy plates or bars having pairs of perforated ears at their lower corners by means of which they are pivotally connected with the eyes 16 and 17 of the long links 14 and 15. Each of the links 18 and 19 at one upper corner is provided with a single perforated ear 20 and at its other upper corner with a pair of spaced perforated ears 21. Pins 22 project through the perforations of the ears 20 and 21, whereby pivotal connections between the links 18 and 19 are established.

On the outwardly projecting ends of the pins 22 I mount the heads 23 of cylindrical plungers 24 which slide in cylindrical bores 25 in the bed of the machine. These plungers are urged upwardly by spiral springs 26. The plungers are guided by the reduced ends of screws 27 which project into longitudinal slots 28 in the plungers. The bottoms of the slots also act as stops to limit the upward movement of the plungers.

In the bolster directly above the aligned pins 22 I mount a presser bar 29, which may have a dovetailed rib set into a dovetailed groove in the bolster and locked in that position by means of a key 30. The bar 29 in the present instance is provided with a transverse groove 31 to receive a rib 32 on the forging. The bar 29 is long enough to form a bridge over the heads of plungers 24.

The links 18 and 19 are formed flat at their upper edges between the pivotal connections and the axis of these connections is in line with the inner upper corners of the links, as indicated in Fig. 1. When an article forged in a deformed shape, like the tractor shoe illustrated in Figs. 1 and 2 of the drawings, is placed over the links 18 and 19, and the presser bar 29 is caused to descend, it first engages the curved web 9 and presses it down upon the links 18 and 19. Shortly thereafter the bar 29 engages the heads 23 of the plungers 24 and pushes them down, thereby carrying downward the pivot pins 22 and with them the links 18 and 19 and 14 and 15. The links 18 and 19 therefore open up and move toward the dotted line positions of Fig. 1. In so doing they bend the web 9 of the forging up toward flat condition. When the links 18 and 19 finally come into aligned positions as shown in dotted lines in Fig. 1, the flat upper edges of the links are in contact and the two links together form a flat table which takes a wide bearing on that portion of the bed 10 which lies between the two sets of links 14, 15. Thus, a very firm backing is provided for the final straightening of the web 9 of the forging.

It will be noted that when this stroke of the machine is completed the side walls or flanges 33 of the forging will extend at right angles to the web 9 and be parallel to each other. When the bolster 11 again rises, the springs 26 expand and return the links 14, 15, 18 and 19 to their original position, indicated in Fig. 1, and the forging is then ready to be removed. It is now transferred by any suitable mechanism timed to the other operations of the machine, or transferred manually if preferred, to the truing and sizing station of the machine, where it is caused to rest upon a flat support 34 which may be mounted in a cavity in the machine bed, as shown in Fig. 1. The support 34 is positioned between the ram 12 and a solid wall 35.

To the bolster 11 of the machine in vertical alignment with the plate 34 I attach a plate 36 by means of a key 37, or otherwise. This plate is hollowed out on its under side to form a track 38 upon which are supported blocks 39 and 40 and an intermediate wedge composed of a block 41 supported in the track and a smaller block 42 secured thereto by any suitable fastening, one or more shims 43 being interposed in order to vary the width of the wedge to a slight extent. The movements of the blocks 40 and 41 on the track 38 are limited by keys 44 set into the plate 36 and extending into grooves 45 in the blocks. Supported upon the plate 36 between the blocks 39 and 41 there is a forming bar 46, and a similar bar 47 is supported from the plate between the blocks 40 and 41.

A pair of track rails 48 are supported from the plate 36 by means of studs 49 which are extended through vertical openings in the rails and are threaded into the plate 36. The heads of these studs support the rails 48 in their lowermost position but permit the rails to approach the plate 36. Coil springs 50 surrounding the bolts 49 tend to maintain the rails 48 spaced away from the plate 36. Between these rails 48 are slidably mounted two outer forming dies 51 and 52 and a pair of inner forming dies 53 and 54. Each of the dies has an inclined dovetail groove 55 therein which is adapted to receive a similarly inclined dovetail rib 56 on one of the blocks 39, 40, 41 and 42. Hence when the rails 48 are caused to approach the plate 36 the outer dies 51 and 52 are slid inwardly along the rails 48 and the inner dies 53 and 54 are spread apart, being guided in that movement by the tracks. Similarly when the rails 48 move away from the plate 36 the dies 51 and 52 are slid outwardly and the dies 53 and 54 are caused to approach each other.

When the bolster 11 descends from the position illustrated in Fig. 1, the rails 48 are lowered until the dies 51 and 52 contact with the upper surface of plate 34 and the dies 53 and 54 contact with the upper surface of the web 9 of the forging. Further downward movement of the tracks 48 is then prevented, so that the continuation of the descent of the bolster 11 causes the plate 36 to approach the tracks 48, compressing the springs 50, whereby the cooperating inclined surfaces of the four dies and the corresponding blocks causes the outer dies 51 and 52 to move inwardly into engagement with the side walls 33 of the forging and causes the inner dies 53 and 54 to be spread apart into engagement with the inner surfaces of those walls. The vertical side of block 39 in its lowered position is substantially in engagement with the wall 35 of the bed of the machine. Hence this wall and the block 39 together form an abutment for the die 51. The ram 12 now advances, striking the block 40 and forcing the die 52 against the adjacent wall 33 of the forging, moving that wall and the entire forging toward the left in Fig. 1 and pressing the two walls of the forging between dies 52 and 54 on the one hand, and 53 and 51 on the other. The bodily movement of the forging upon the plate 34 is slight, that is of the order of $\frac{1}{32}$nd or $\frac{1}{16}$th of an inch. When the ram strikes the block 40, the mounting of that block in the plate 36 enables it to travel the necessary distance toward the left, and the mounting of the block 41 gives to it the same capability.

After the side walls of the forging have thus been trued up and sized by the force exerted upon the dies through the ram 12, the latter recedes and the bolster 11 starts upwardly. When this occurs the springs 50 hold the rails 48 in their lowered position, whereby the blocks 39, 40, 41 and 42 move the dies 51 and 52 outwardly and the dies 53 and 54 inwardly out of engagement with the side walls of the forging. Hence, when the heads of the studs 49 engage the rails 48 to lift them the dies are free of engagement with the forging. The finished forging on the plate 34 may now be removed, a bent-up forging may be transferred from the links 18, 19 to the plate 34, and another deformed forging placed upon the links 18 and 19 in preparation for the next operation of the machine.

In Figs. 5, 6 and 7 I have illustrated a modification of the truing up and sizing portion of my machine, it being understood that the complete machine comprises mechanism for performing the bending operation. In this form of the invention the bed of the machine has mounted upon it a supporting and guiding plate 57 which is machined to receive a sliding support 58. Coil springs 59 tend to move the plate 58 toward the right in Fig. 5. The plate 58 has an upstanding rib 60 of triangular cross section over which the rib 32 of the forging is designed to rest. A forming die 61 is mounted above the guide plate 57 and abuts against a portion 62 of the machine bed or frame. Another outer forming die 63 has a depending portion 64 which runs in the same track portion of the plate 57 in which the supporting plate 58 is mounted. The dies 61 and 63 therefore remain always in the same horizontal plane.

Two expanding dies 65 and 66 are supported upon a block 67 having a wedge portion 68 engaging with the inclined surfaces of the dies 65 and 66. At its ends the block 67 has laterally extending wings 69 which assist in guiding the dies 65 and 66 in their movements in inclined paths. Each of the dies 65 and 66 has threaded therein near its ends inclined posts 70 which extend upwardly through cylindrical cavities 71 in the dies, through short perforations 72 in the block 67 and into cylindrical cavities 73 in that block. There are heads on the upper ends of these posts which are adapted to contact with the shoulders at the bases of the cavities 73 to limit the downward movement of the dies 65 and 66. Coil springs 74 surround the posts 70 within the cylindrical cavities 71 and bear at their opposite ends against the dies and the block 67, tending to cause relative downward movement of the dies 65 and 66. The block 67 is mounted in a track or guide groove in a supporting plate 75 which is mounted in the bolster 11 in the usual manner by means of a dovetail tongue and groove and a key 76. The block 67 is urged toward the right in Figs. 5 and 6 by a pair of coil springs 77, and its movement in that direction is limited by a pair of stop pins 78 which are threaded into the plate 75 and have depending ends extending into grooves 79 in the block 67. The movements of the die 63 and the supporting plate 58 toward the right are also limited by a pair of stop pins 80 mounted in the supporting plate 57 and extending upwardly into the guiding groove for the plate 58 and depending end 64 of the die 63.

When the dies are in the inoperative position illustrated in Fig. 6, the forging is placed by the operator upon the sliding plate 58 as also illustrated in that figure. The bolster 11 is then caused to descend, carrying the dies 65 and 66 into engagement with the upper surface of the web 9 of the forging. The continuation of this movement causes the wedge 68 to spread apart the dies 65 and 66, the springs 74 being contracted during such movement. When the descent is complete the forging is firmly gripped by the dies 65 and 66 and by the lower end of the wedge 68 all pressing through the web 9 against the slidable plate 58. At the same time the overhanging portions of the block 67 engage the upper surfaces of the side members 33 to bring them to accurate dimensions. A ram 81 is now caused to move toward the left engaging the die 63 and the block 67 simultaneously, thereby moving all the dies 65, 66 and 63 toward the left and compressing the walls 33 of the forging between pairs of adjacent dies, the die 61 being fixed in position by the abutment 62. The walls of the forging are thereby trued up and accurately sized. The ram 81 then recedes and the coil springs 59 and 77 act to move the plate 58 and the block 67 toward the right carrying the dies 65, 66 and 63, together with the forging, in that direction. Thereafter the bolster 11 rises. During the first portion of its upward movement the dies 65 and 66 remain in contact with the web 9 of the forging for the reason that the springs expand to hold the dies 65 and 66 down. Because of the cooperating inclined surfaces on the wedge 68 and the dies 65 and 66 this relative movement between the wedge and the dies causes the latter to move toward each other and to thereby disengage themselves from the overhanging portions of the forging rails. As soon as the heads of the posts 70 engage the bottoms of the cavities 73 in the block 67 further upward movement of that block raises the dies 65 and 66 out of the space between the side walls of the forging up to the position illustrated in Fig. 6, after which the finished forging may be removed.

Having thus described my invention, I claim:

1. In a machine of the class described, a horizontal bearing plate adapted to support a forging having spaced side walls in such manner as to permit slight horizontal movement of the forging, a forming die for each outer wall of the forging and a pair of forming dies for the inner walls thereof, means for inserting and withdrawing said pair of dies, an abutment for one of said outer dies, and a ram movable horizontally to press the other of said outer dies toward said abutment and exert force therethrough and through the remaining dies and the walls of the forging to form the latter.

2. In a machine of the class described, a bearing plate adapted to support a forging having spaced side walls, a vertically movable bolster, a track hung therefrom, a forming die for each outer wall and a pair of forming dies for the inner walls of said forging, said dies being mounted to move in said track, said outer dies having upwardly and inwardly inclined surfaces and said inner dies having inner surfaces inclined upwardly away from each other, said bolster carrying means adapted to coact with said inclined surfaces for moving said dies upon said track into position adjacent the walls of the forging, and a ram movable in alignment with said dies to exert pressure against the dies from one end thereof for forming the walls of the forging.

3. In a machine for forming forgings having a flat web and a pair of side walls, a backing for said web, an outer forming die adapted to form the outer side of one wall of the forging, an abutment for said die, a pair of dies adapted to be moved into and out of the space between the forging walls, a movable outer die adapted to form the outer surface of the other wall of the forging, and a ram adapted to push the last named die toward said abutment and exert force therethrough and through the remaining dies and the walls of the forging to form the latter.

4. In a machine for forming forgings having a flat web and a pair of side walls, a backing for said web, an outer forming die adapted to form the outer side of one wall of the forging, a pair of dies for forming the inner surfaces of the side walls, means for inserting and withdrawing said pair of dies, a wedge associated with said means for spreading the dies apart when within the forging, a movable outer die adapted to form the outer surface of the other wall of the forging, and a ram adapted to push the last named die toward said abutment and exert force therethrough and through the remaining dies and the walls of the forging to form the latter.

5. In a machine of the class described, a bearing plate adapted to support a forging having spaced side walls, a vertically movable bolster, a track hung therefrom, a forming die for each outer surface and a pair of forming dies for the inner surfaces of the side walls of said forging, said dies being mounted to move in said track, said outer dies having upwardly and inwardly inclined surfaces and said inner dies having inner surfaces inclined upwardly away from each other, said bolster carrying blocks having inclined surfaces adapted to coact with the inclined surfaces of said dies for shifting the dies along said track into engagement with the side walls of the forging, an abutment for one of the end blocks, means permitting the remaining blocks to move in the bolster in a direction parallel to the length of said track, and a ram movable in alignment with said dies to exert pressure against the dies from one end thereof towards said bolster.

6. In a machine for forming forgings having a web and a flange, means for supporting the forging in such manner as to permit movement thereof parallel to the web, two forming dies for forming the opposite surfaces of said flange, means for moving the said dies toward and away from the forging on opposite sides of said flange, an abutment for one of said dies on the side away from said flange, and means for moving the other die towards said abutment, whereby the forging is moved bodily a short distance and the flange is compressed between the dies.

7. In a machine for forming forgings having a web and a flange, a support for the web adapted to permit movement of the forging parallel to the web, a die on one side of said flange movable toward and away from the flange in a direction parallel to the plane of said web, a bolster movable toward and away from said web, a block slidable on the bolster in a direction parallel to the plane of said web, a die mounted on said block, on the side of said flange which is opposite the first mentioned side, and means for engaging said first named die and said block and moving them simultaneously parallel to said web with said flange interposed between the dies, and means in alignment with the dies for stopping the movement of the die on said block, whereby the flange is accurately formed between the dies.

8. In a machine for forming a forging having a web and two parallel flanges, a support for the web adapted to permit movement of the forging parallel to the plane of the web, a die positioned on the outer side of one flange, an abutment for said die, a bolster movable toward and away from said web, a block slidable on the bolster in a direction parallel to the plane of said web, a pair of dies mounted on said block adapted to enter between the flanges of the forging, a fourth die slidably mounted on the outer side of the forging remote from said first die, means associated with the block and actuated by the movement of the bolster for spreading apart said pair of dies between said flanges, and a ram for contacting said last named die and moving said flanges and said pair of dies parallel to said web until stopped by said first named die, whereby the flanges are pressed between adjacent dies.

9. In a machine for forming a forging having a web and two parallel flanges, a support for the web adapted to permit movement of the forging parallel to the plane of the web, a die positioned on the outer side of one flange, an abutment for said die, a bolster movable toward and away from said web, a block slidable on the bolster in a direction parallel to the plane of said web, a pair of dies mounted on said block adapted to enter between the flanges of the forging, a fourth die slidably mounted on the outer side of the forging remote from said first die, means associated with the block and actuated by the movement of the bolster for spreading apart said pair of dies between said flanges, a ram for contacting said last named die and moving said flanges and said pair of dies parallel to said web until stopped by said first named die, whereby the flanges are pressed between adjacent dies, and means for returning said block and said movable outer die to their former positions when the ram is retracted and for thereafter retracting said bolster.

10. In a machine for forming forgings, means for supporting the forging in such manner as to permit horizontal movement thereof, opposed dies, means for moving said dies vertically into position upon opposite sides of the forging, and means independent of said vertically moving means for impressing force upon said dies to produce relatively inward horizontal movement.

11. In a machine for forming forgings, a pair of opposed dies, means for moving said dies vertically into position upon opposite sides of the forging, and means comprising a horizontally movable ram for producing relative movement of said dies horizontally against the opposite sides of the forging.

12. In a machine for forming forgings, a pair of opposed dies, a vertically movable carrier therefor, means for moving said carrier vertically to position the dies upon opposite sides of the forging, means supported by said carrier for moving the dies toward the forging after the vertical movement of the dies is completed, and separate horizontally moving means for producing relative movement of the dies against the opposite sides of the forging.

13. In a machine for forming forgings, having a flat web and a pair of lateral flanges, a backing for said web, an outer forming die adapted to form the outer side of one of said lateral flanges, an abutment for said die, a die adapted to be positioned in the space between said lateral flanges, a second outer die adapted to form the outer surface of the other of said lateral flanges, and a ram adapted to push the last named die toward said abutment and exert force therethrough and through the remaining dies and the lateral flanges of the forging to form the latter.

14. In a machine for forming forgings having a web and a flange, means for supporting the forging in such manner as to permit movement thereof parallel to the web, two forming dies for forming the opposite surfaces of said flange, means for moving said dies toward and away from said flange, an abutment for one of said dies on the side thereof remote from said flange, and means for moving the other of said dies toward said abutment whereby the forging is moved bodily a short distance and the flange is compressed between the dies.

15. A machine for forming forgings having a base portion and a plurality of lateral flanges on one side thereof, comprising a die for engaging within a channel formed by said lateral flanges, a second die for engaging the outside surface of one of said lateral flanges, a third die for engaging the outside surface of another of said lateral flanges, means for preventing movement of the said second die while said third die is moved relative thereto, and means for moving said third die towards said second die.

16. A machine for forming forgings having a base portion and a plurality of lateral flanges on one side thereof, comprising a die for engaging within a channel formed by said lateral flanges, a second die for engaging the other side of said base portion, means for producing relative movement between said dies, whereby they are engaged and disengaged with the forging, a third die for engaging the outside surface of one of said lateral flanges, a fourth die for engaging the outside surface of another of said lateral flanges, means for preventing movement of said third die while said fourth die is moved relative thereto, and means for moving said fourth die in a direction normal to the direction of said relative movement between the first and second dies.

17. A machine for forming forgings having a base portion and a plurality of lateral flanges on one side thereof, comprising a die for engaging within a channel formed by said lateral flanges, a second die for engaging the other side of said base portion, means for producing relative movement between said dies to engage and disengage the same with the forging, a third die for engaging the outside surface of one of said lateral flanges, a fourth die for engaging the outside surface of another of said lateral flanges, an abutment for limiting the movement of said third die in a direction normal to said relative movement between the first and second mentioned dies, and means for moving said fourth die toward said abutment.

HOWARD F. JOHNSON.